US010763649B2

(12) United States Patent
Dir et al.

(10) Patent No.: US 10,763,649 B2
(45) Date of Patent: Sep. 1, 2020

(54) CABLE FEEDER

(71) Applicant: Greenlee Textron Inc., Rockford, IL (US)

(72) Inventors: Corey Britton Dir, Rockford, IL (US); Joshua Curtis Kerns, Rockford, IL (US); Daniel John Marben, Rockford, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 625 days.

(21) Appl. No.: 14/734,273

(22) Filed: Jun. 9, 2015

(65) Prior Publication Data

US 2015/0364903 A1    Dec. 17, 2015

Related U.S. Application Data

(60) Provisional application No. 62/011,697, filed on Jun. 13, 2014.

(51) Int. Cl.
*H02G 1/08* (2006.01)
*H02G 11/00* (2006.01)
(Continued)

(52) U.S. Cl.
CPC .............. *H02G 1/08* (2013.01); *B65H 51/10* (2013.01); *H02G 1/06* (2013.01); *H02G 3/0456* (2013.01); *H02G 11/00* (2013.01)

(58) Field of Classification Search
CPC ...... H02G 1/08; H02G 1/085; H02G 1/00–16; H02G 3/0456; H02G 3/0418; H02G 3/08;
(Continued)

(56) References Cited

U.S. PATENT DOCUMENTS 644,884 A * 3/1900 Wrigley ............... H02G 1/04
226/177
1,038,093 A * 9/1912 Crawford ............. H02G 1/08
15/104.33
(Continued)

FOREIGN PATENT DOCUMENTS

CN     2876037       3/2007
JP     S5145793 A    4/1976
(Continued)

OTHER PUBLICATIONS

Maxis Feeder (Maxis Feeder Med Volt Pull, Published on Jul 20, 2012 at https://www.youtube.com/watch?v=3bR9Y4to88Q) (Year: 2012).*

(Continued)

*Primary Examiner* — Lee D Wilson
*Assistant Examiner* — Mahdi H Nejad
(74) *Attorney, Agent, or Firm* — Klintworth & Rozenblat IP LLP

(57) ABSTRACT

A cable feeder for feeding cables through a structure according to some embodiments of the disclosure includes a housing having a drive roller attached thereto, and idler roller assembly attached to the housing. In an embodiment, the idler roller assembly can be released from the housing to allow cable to be released from the cable feeder. In an embodiment, the housing is formed from upper and lower housings, and the position of the lower housing and idler roller assembly can be adjusted relative to the upper housing and drive roller.

15 Claims, 11 Drawing Sheets

(51) Int. Cl.
*H02G 1/06* (2006.01)
*H02G 3/04* (2006.01)
*B65H 51/10* (2006.01)

(58) Field of Classification Search
CPC .... H02G 11/00; H02G 1/06; G02B 6/48–486;
G02B 6/46; G02B 6/50–54; B66D 1/00;
B66D 1/26; B66D 1/38; B66D 3/00;
B66D 3/046; B66D 2700/0166; B66D
1/14; B65H 51/10
USPC .................................. 254/134.3 R, 394–396,
254/134.3 FT–134.3 SC, 414, 333, 368;
138/158; 269/236, 66, 138, 162, 196,
269/198, 217, 229
See application file for complete search history.

(56) References Cited

U.S. PATENT DOCUMENTS

| | | | |
|---|---|---|---|
| 2,018,906 A | 3/1935 | Winter | |
| 2,262,364 A * | 11/1941 | Hugel | E21B 33/072 166/77.1 |
| 2,316,798 A * | 4/1943 | Luebbe | B65H 51/10 124/78 |
| 3,265,268 A * | 8/1966 | Bach | B21F 27/10 226/112 |
| 3,559,941 A | 2/1971 | Holzman et al. | |
| 3,671,998 A * | 6/1972 | Ruiz | E05D 7/1011 15/392 |
| 3,783,495 A * | 1/1974 | Derrer | H02G 1/02 254/134.3 CL |
| 4,235,362 A * | 11/1980 | Hubenko | B65H 51/10 140/2 |
| 4,445,668 A * | 5/1984 | Sauber | B65H 51/10 226/177 |
| 4,635,875 A * | 1/1987 | Apple | B66D 1/36 242/155 BW |
| 4,770,401 A * | 9/1988 | Donaldson | B25B 1/18 269/225 |
| 5,005,813 A * | 4/1991 | Lawrence | B25B 5/006 269/236 |
| 5,045,741 A * | 9/1991 | Dvorsky | F02N 11/02 310/209 |
| 5,064,172 A * | 11/1991 | Hereford | H02G 1/04 254/134.3 PA |
| 5,139,246 A * | 8/1992 | Yakou | B25B 1/18 269/242 |
| 5,382,313 A * | 1/1995 | Eminger | B41F 16/00 156/579 |
| 5,711,397 A | 1/1998 | Flora et al. | |
| 5,779,229 A | 7/1998 | Lirette | |
| 5,839,613 A * | 11/1998 | Marcout | F16L 55/18 226/176 |
| 5,938,155 A | 8/1999 | Garland | |
| 6,073,916 A * | 6/2000 | Plummer | H02G 1/08 226/182 |
| 6,094,792 A * | 8/2000 | Frye | H02G 1/04 174/5 R |
| 6,168,062 B1 * | 1/2001 | Varner | B66C 13/10 212/89 |
| 6,267,355 B1 * | 7/2001 | Fletcher | B65H 57/16 242/615 |
| 6,367,778 B1 * | 4/2002 | Mobley | B65H 51/10 254/134.3 R |
| 6,375,163 B1 * | 4/2002 | Carlson | H02G 1/04 254/134.3 PA |
| 6,612,516 B1 * | 9/2003 | Haines | B65H 49/32 242/397.1 |
| 6,926,236 B2 | 8/2005 | Jette | |
| 6,962,234 B1 | 11/2005 | Reeves | |
| 7,715,679 B2 * | 5/2010 | Kowalczyk | G02B 6/3897 242/372 |
| 7,756,379 B2 * | 7/2010 | Kowalczyk | G02B 6/4441 385/135 |
| 8,074,347 B2 * | 12/2011 | Anderson | B65H 49/321 140/147 |
| 8,246,009 B2 * | 8/2012 | Plummer | H02G 1/08 254/134.3 FT |
| 8,276,883 B2 * | 10/2012 | Heatley | G01F 1/103 254/134.3 R |
| 8,322,689 B2 * | 12/2012 | Johnson | H02G 1/02 254/134.3 FT |
| 8,444,115 B2 * | 5/2013 | Tester | H02G 1/085 254/134.3 FT |
| 8,579,260 B2 * | 11/2013 | Raineri | H02G 1/08 254/134.3 R |
| 8,783,416 B2 * | 7/2014 | Singleton | B61K 3/00 184/3.1 |
| 8,789,811 B2 * | 7/2014 | Iwama | B25B 25/00 254/134.3 FT |
| 8,958,681 B2 * | 2/2015 | Ripplinger | G02B 6/46 385/136 |
| 9,074,830 B2 * | 7/2015 | Moll | B08B 9/0433 |
| 9,793,690 B2 * | 10/2017 | Jordan | H02G 1/08 |
| 2007/0286681 A1 * | 12/2007 | Parent | E02F 5/101 405/174 |
| 2008/0101869 A1 * | 5/2008 | Jeong | F16L 3/012 405/174 |
| 2009/0236477 A1 * | 9/2009 | Oh | H02G 1/04 248/65 |
| 2009/0236575 A1 * | 9/2009 | Cherix | G02B 6/4464 254/134.4 |
| 2010/0084621 A1 * | 4/2010 | Raineri | H02G 1/08 254/134.3 R |
| 2013/0026429 A1 * | 1/2013 | Jordan | H02G 1/08 254/134.3 R |
| 2013/0068811 A1 | 3/2013 | Matteson et al. | |
| 2013/0075234 A1 * | 3/2013 | Ishibashi | B65H 27/00 198/780 |
| 2016/0354820 A1 * | 12/2016 | Katou | H02G 1/06 |

FOREIGN PATENT DOCUMENTS

| | | | | |
|---|---|---|---|---|
| JP | H02151220 A | 6/1990 | | |
| KR | 20120055839 A | 6/2012 | | |
| WO | WO 99/15454 | * | 4/1999 | B65H 75/18 |
| WO | 2007007181 A1 | 1/2007 | | |

OTHER PUBLICATIONS

Maxis Feeder (Owners Manual) (Year: 2016).*
Maxis Feeder (Brochure) (Year: 2015).*
Maxis Feeder (Brochure 2011) (Year: 2011).*
Greenlee Cable Tray Feeder Brochure (Year: 2015).*
MCF01 Maxis Feeder Product Feature, 2014 Southwire Company, 2 pages.
Photograph of Koyo Dragon-Super Kubo ABS-130P, Super Kubo AB2R-150P, and Kubo FB-150.
Photograph of Koyo Dragon-Multi-Kubo AV-200, Super Puller EBW-130 and Super Puller EB 2 R-100.
Photograph of Koyo Dragon-Puller EB-150, Super Puller EB4W-130, and ABS-130CD.
Photograph of Koyo Dragon-EBS-150CD, L Super Hauler Model EB-230I, L Super Hauler Model EB-300B, and L Super Hauler Model EB-230SV.
Photograph of Koyo Dragon-Back Tension Equipment and AW-500 Mini Air Winch.
Photograph of Koyo Dragon-Mooring Rope Handling Equipment, Various Ball Roller for Lift of Fishing Net.
Photograph of Rubber Flexible Coupling.
Photograph of Koyo Dragon (Man-power Saving Equipments).
Photograph of Towa-TTB-180-OP, TTB-160SS, and TTB-200-OP/4WD.
Photograph of Towa-OT-300, TTB-180-OP, TTB-mini-OP/100, and TTB-200-OP/4WD.
Photograph of Towa-(CV/CTV, CE/CET).

(56) References Cited

OTHER PUBLICATIONS

Photograph of Towa-CW-M500, CW-1000C/1500C, CW-M300, and IS-CG1000.
Photograph of Ono Machine & Tool Mfg. Co., Ltd. TR-135-F0 and TR-110.
Immi Outfitters in Saftey article, Hook, Ratchet and Go!, 2 pages. http://www.southwiretools.com/tools/tools/MCF01.
Anonymous, "HIS Business Mfg. Co.", Dec. 31, 2013 (Dec. 31, 2013), retrieved from the Internet: URL:http://www.hizbiz.com/hb1a9Feature.asp.
European Search Report dated Oct. 5, 2015 for European Application No. 15171096.9, 7 pages.
European Search Report dated Nov. 4, 2015 for European Application No. 15171130.6, 6 pages.

* cited by examiner

CABLE FEEDER

This application claims the domestic benefit of U.S. provisional application Ser. No. 62/011,697, filed on Jun. 13, 2014, the contents of which are incorporated herein in its entirety.

FIELD OF THE DISCLOSURE

The present disclosure relates generally to cable pulling, and specifically relates to a cable feeder for feeding cable along a cable tray.

BACKGROUND

Cable trays are commonly used in industrial-type buildings for routing cable. The cable lays on top of the cable tray and is visible. The cable can be easily changed and additional cables can be easily added. When pulling cables into a cable tray, a guide system is required to control the cable location since a full enclosure (conduit) is not provided.

Many current cable pulling accessories/feeders are fastened using loose pieces, such as screws and nuts that can easily be lost, dropped, or require extra hardware or hands to install quickly. Other attachment methods include screw-driven clamps that require handles and repetitive twisting motion to grab onto one or both sides of the cable tray. Cam locks also exist, but require users to adjust settings if desiring use on a wider range of tray sizes.

SUMMARY

In the present disclosure, a cable feeder is provided for feeding cable to a cable tray. The cable feeder provides improvements to the existing prior art and overcomes the disadvantages presented by the prior art. Other features and advantages will become apparent upon a reading of the attached specification, in combination with a study of the drawings.

A cable feeder for feeding cables through a structure according to some embodiments of the disclosure includes a housing having a drive roller attached thereto, and idler roller assembly attached to the housing. In an embodiment, the idler roller assembly can be released from the housing to allow cable to be released from the cable feeder. In an embodiment, the housing is formed from upper and lower housings, and the position of the lower housing and idler roller assembly can be adjusted relative to the upper housing and drive roller.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION OF THE ILLUSTRATED EMBODIMENTS

Figure 1:
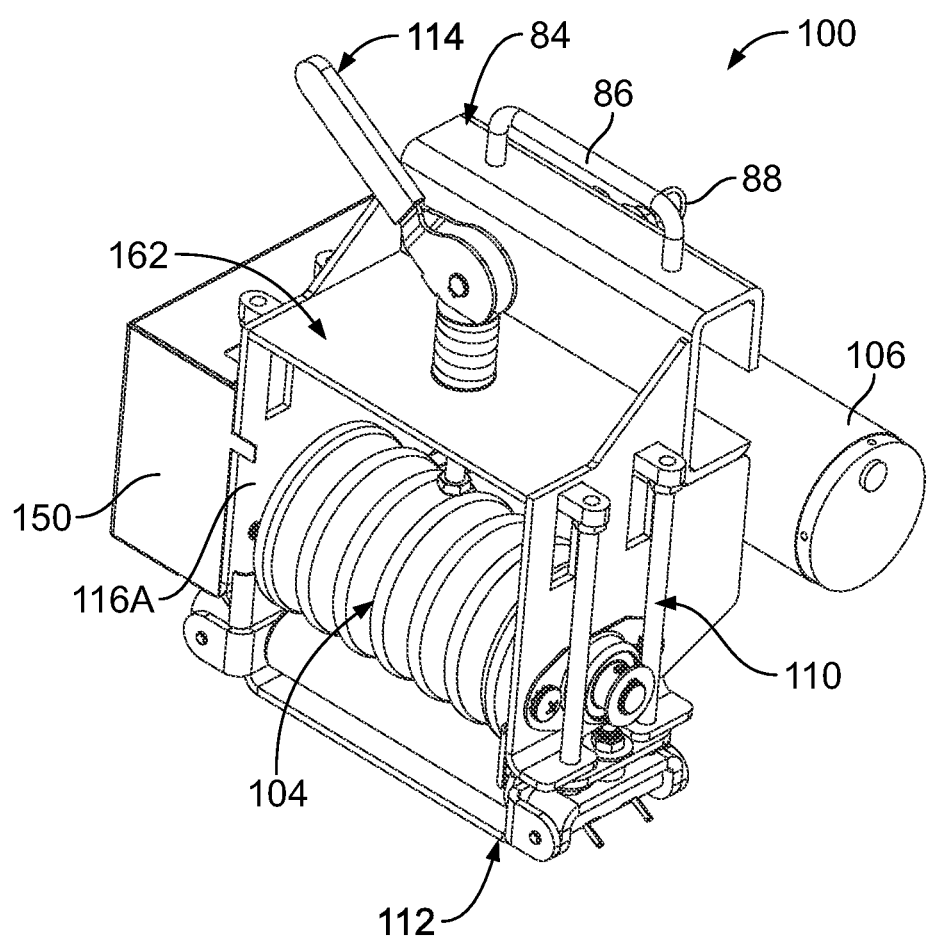
FIG. 1 is a perspective view of a cable feeder according to a first embodiment of the disclosure.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

As is known in the art, a cable tray 20 is formed of a base 22 hung from the ceiling of a building by tray hangers (not shown) which may be formed of threaded rods, which attach between the base 22 and the ceiling. The base 22 may be formed of a ladder-type rack having a pair of rails 24a, 24b with a plurality of spaced apart rungs 26 or mesh (not shown) or solid surface (not shown) extending between the rails 24a, 24b. Cable 28 is laid on top of the base 22 for routing through the building. Cable trays 20 are commonly formed out of aluminum, fiberglass or steel. As is known in the art, cable trays 20 can be used instead of conduit.

Figure 3:
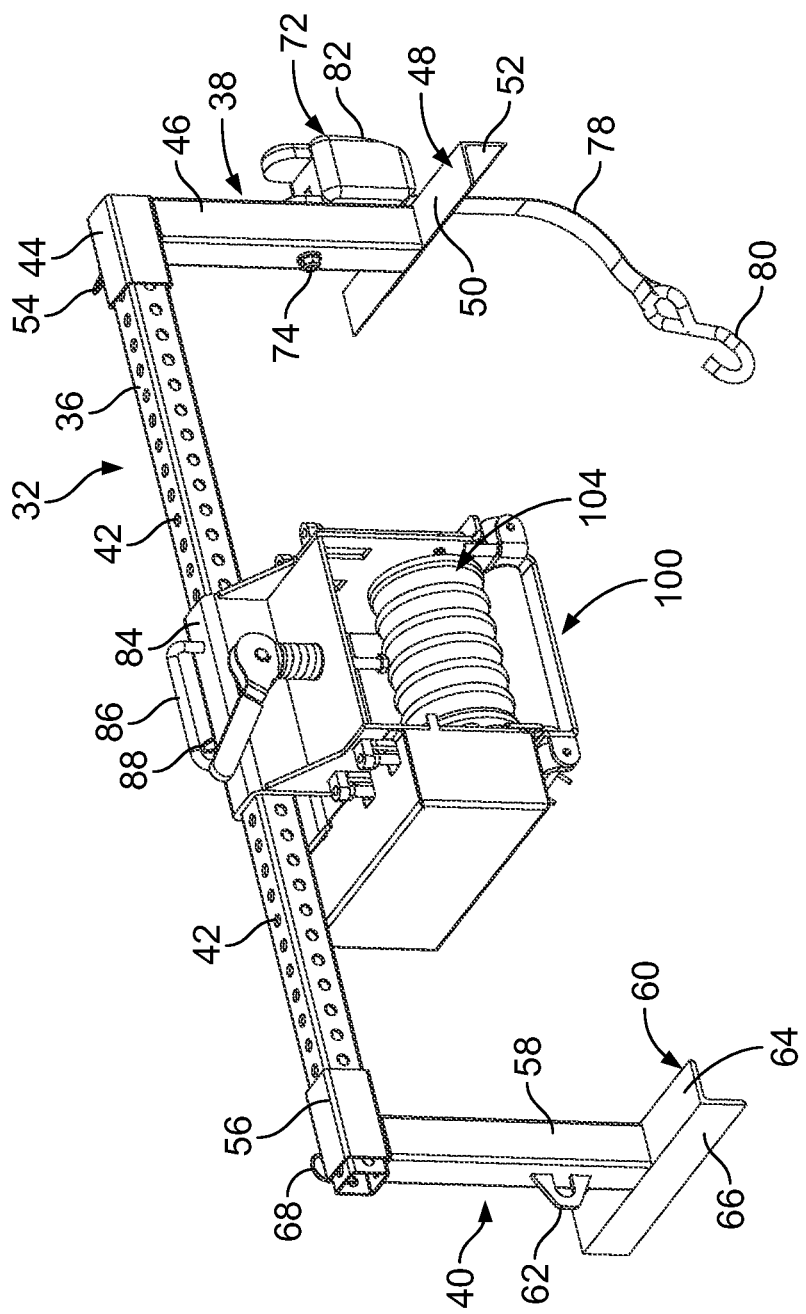
FIG. 3 is a perspective view of the cable feeder of FIG. 1 attached to a mounting assembly.
Figure 4:
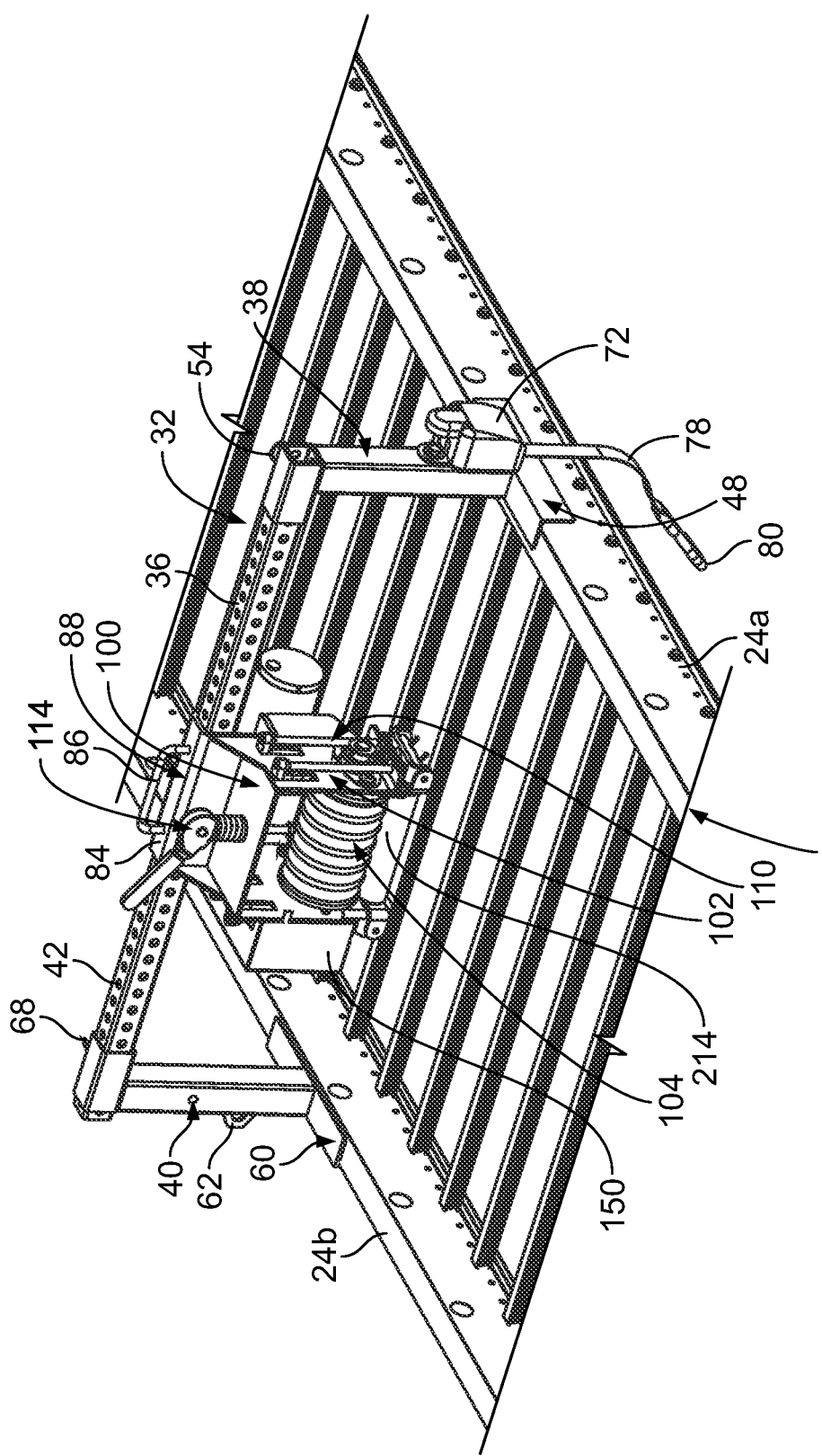
FIG. 4 is a perspective view of the cable feeder of FIG. 1 and mounting assembly of FIG. 3 suspended above and attached to a cable tray.

The present disclosure provides a cable feeder 100 for feeding cable 28 along the cable tray 20. The cable feeder 100 quickly and easily installs onto the cable tray 20. The cable tray feeder 100 is attached to the cable tray 20 by a mounting assembly, such as mounting assembly 32. Such a suitable mounting assembly 32 is disclosed in U.S. patent application Ser. No. 14/303,798, filed on Jun. 13, 2014, and which is commonly owned, and which disclosure is hereby incorporated by reference in its entirety. The mounting assembly 32 is best shown in FIGS. 3 and 4 and the cable tray 20 is shown in FIG. 4.

As disclosed in U.S. patent application Ser. No. 14/303, 798, the mounting assembly 32 includes an elongated rod 36, a first arm 38 extending from the rod 36, a second arm 40 extending from the rod 36, and a ratchet mechanism attached to the first arm 38 and which can be attached to the second arm 40. The first and second arms 38, 40 are slideable along the rod 36.

The elongated rod 36 has a plurality of spaced apart apertures 42 provided therein. In some embodiments, such as that illustrated, the rod 36 has a square cross-section, and spaced apart apertures 42 along at least two of its sides, but it will appreciate that other cross-sections are contemplated within the scope of the disclosure.

The first arm 38 includes a mounting section 44 which attaches to the rod 36, an elongated extending section 46 which extends from the mounting section 44, and an engaging section 48 which extends from the extending section 46. The mounting section 44 preferably has a shape which mirrors the shape of the cross-section of the rod 36 and surrounds the rod 36. As shown, the mounting section 44 has a square cross-section having a central passageway through which the rod 36 extends. The mounting section 44 is slideable along the length of the rod 36. An aperture is provided through the mounting section 44 and is aligned with one of the plurality of apertures 42 when the mounting section 44 is positioned in a desired position. The extending section 46 has upper and lower ends, an inner surface which faces the second arm 40, and an opposite outer surface. The upper end of the extending section 46 is attached to the mounting section 44, and the extending section 46 extends downwardly therefrom. The engaging section 48 extends from the lower end of the extending section 46. The engaging section 48 is preferably L-shaped and has a horizontal leg 50 and a vertical leg 52.

A lock 54, for example a spring loaded pin, a rotatable pin or a cotter pin, is provided for locking the first arm 38 to the rod 36. The lock 54 extends through the aperture in the mounting section 44 and is capable of being engaged with one of the apertures 42 in the rod 36. The lock 54 is disengaged from the rod 36 in a released position to allow the first arm 38 to be slid along the rod 36 to a desired position, and the lock 54 is engaged into one of the apertures 42 in the rod 36 in an engaged position to prevent the movement of the first arm 38 relative to the rod 36. The lock 54 is preferably permanently attached to the mounting section 44.

The second arm 40 includes a mounting section 56 which attaches to the rod 36, an elongated extending section 58 which extends from the mounting section 56, and an engaging section 60 which extends from the extending section 58. The mounting section 56 preferably has a shape which mirrors the shape of the cross-section of the rod 36 and surrounds the rod 36. As shown, the mounting section 56 has a square cross-section having a central passageway through which the rod 36 extends. The mounting section 56 may be slideable along the length of the rod 36. An aperture is provided through the mounting section 56 and is aligned with one of the plurality of apertures 42 when the mounting section 56 is positioned in a desired position. The extending section 58 has upper and lower ends, an inner surface which faces the first arm 38, and an opposite outer surface. The upper end of the extending section 58 is attached to the mounting section 56, and the extending section 58 extends downwardly from the mounting section 56. A hook attachment member 62 extends from the outer surface of the extending section 58. The hook attachment member 62 may take a variety of forms, such as a U-shaped member as shown in the drawings, an L-shaped member having an opening at its upper end, etc. The engaging section 60 extends from the lower end of the extending section 58. The engaging section 60 is preferably L-shaped and has a horizontal leg 64 and a vertical leg 66.

The second arm 40 may have a lock 68 like that of the first arm 38 which extends through the aperture in the mounting section 56 and is capable of being engaged with one of the apertures 42 in the rod 36, or may have a permanent fastener 70, such as a screw, which is inserted through the aperture in the mounting section 56 and into one of the apertures 42 in the rod 36. Preferably, if the second arm 40 is permanently fixed into position, the second arm 40 is mounted at an end of the rod 36 to allow for the maximum travel length along the rod 36 for the first arm 38.

A ratchet mechanism 72 is attached to the first arm 38, for example by a fastener 74 that extends through the extending section 46 and into the ratchet mechanism 72. The ratchet mechanism 72 includes a ratchet 76 having a single-sided auto-retracting strap 78 with S-hook 80 sewn onto the end. A rubber-coated handle 82 on the ratchet 76 allows users to ratchet tight the strap 78 when the hook 80 is latched onto the hook attachment member 62 on the second arm 40 as described herein. Such a suitable ratchet mechanism 72 is sold under the trade name CargoBuckle by Immi. The strap 78 can be extended from and retracted into the ratchet 76 as is known in the art.

The mounting assembly 32 further includes a feeder mounting channel 84 having a central passageway 85 through which the rod 36 extends, a handle 86 attached to the mounting channel 84 preferably along its top surface, and a lock 88 for locking the feeder mounting channel 84 into a desired position. The feeder mounting channel 84 is mounted between the arms 38, 40 and is slideable along the rod 36 between the arms 38, 40. The feeder mounting channel 84 may surround the rod 36 having a central passageway through which the rod 36 extends. Alternatively, the feeder mounting channel 84 may be generally U-shaped such that the central passageway 85 forms a pocket, with walls 87a, 87b, 87c engaging the side, the top and the other side of the rod 36. An aperture is provided through the feeder mounting channel 84 and is aligned with one of the plurality of apertures 42 when the feeder mounting channel 84 is positioned in a desired position. The lock 88, for example a spring loaded pin, a rotatable pin or a cotter pin, is provided for locking the feeder mounting channel 84 to the rod 36. The lock 88 extends through the aperture in the feeder mounting channel 84 and is capable of being engaged with one of the apertures 42 in the rod 36. The lock 88 is disengaged from the rod 36 in a released position to allow the feeder mounting channel 84 to be slid along the rod 36 to a desired position, and the lock 88 is engaged into one of the apertures 42 in the rod 36 in an engaged position to prevent the movement of the feeder mounting channel 84 relative to the rod 36. The lock 88 is preferably permanently attached to the feeder mounting channel 84. As described herein, a user can grasp the handle 86 to slide the cable feeder 100 along the length of the rod 36 to a desired position.

The rod 36 has an axis which falls along the length of the rod 36. The cable tray 20 has an axis which falls along the length of the cable tray 20. The axis of the rod 36 is transverse or substantially transverse to that of the axis of the cable tray 20.

The cable feeder 100 is attached to the feeder mounting channel 84, for example by welding or by a fastener, and as such, is in a suspended position above the base 22 of the cable tray 20 as show in FIG. 4. The cable feeder 100 can move laterally, that is side to side, relative to the cable tray 20, by moving the feeder mounting channel 84 on the rod 36.

To use the mounting assembly 32, the user seats the second arm 40 on the rail 24*b* of the cable tray 20 by positioning the engaging section 60 on the rail 24*b*. If the engaging section 60 is L-shaped, the horizontal leg 64 seats on top of the upper surface of the rail 24*b*, and the vertical leg 66 abuts against the outer surface of the rail 24*b*. If not permanently attached to the rod 36, the user then fixes the second arm 40 in position relative to the rod 36 using the lock 68. Thereafter, the first arm 38 is slid along the length of the rod 36 until the first arm 38 is positioned such that engaging section 48 seats on the rail 24*a*. The first arm 38 can be moved to a variety of positions to accommodate a large number of widths of cable trays 20. If the engaging section 48 is L-shaped, the horizontal leg 50 seats on top of the upper surface of the rail 24*a*, and the vertical leg 52 abuts against the outer surface of the rail 24*a*. Thereafter, the lock 54 is engaged to fix the first arm 38 in position relative to the rod 36.

Thereafter, the strap 78 and hook 80 are extended from the ratchet 76, extended around the bottom of the cable tray 20 (the side opposite to where the cable 28 lays), and attached to the hook attachment member 62 on the second arm 40. The strap 78 auto-retracts into the ratchet 76 to eliminate any slack, and the handle 82 can be activated to further reduce any slack and secure the strap 78 to the cable tray 20. The ratchet mechanism 72 reduces time/manpower requirements currently associated with setting up and performing cable tray pulls, as well as providing an easily adjustable and secure method of clamping/connecting the cable feeder 100 to the cable tray 20. The ratchet mechanism 72 can be used to connect cable feeders 100 to all sizes and types of cable trays 20, and the ratchet mechanism 72 utilizes the compressive strength of the cable tray 20 to securely install the attached cable feeders 100. The ratchet mechanism 72 is adjustable and provides strength and security in fastening cable feeders 100 to cable trays 20. The ratchet mechanism 72 does not require twisting or squeezing motions from the user to tighten a clamp, and the ratchet mechanism 72 does not require two separate clamps on each side of the cable tray 20 because the strap 78 extends underneath the cable tray 20 to both sides. As a result of the flexibility provided by the ratchet mechanism 72, the ratchet mechanism 72 is compatible with a variety of cable trays 20 as the ratchet mechanism 72 conforms to the shape of the cable tray 20 to which the ratchet mechanism 72 is connected.

The cable feeder 100 is positioned in the desired position relative to the cable tray 20 between the arms 38, 40 and secured to the rod 36 using the lock 88. The cable 28 can then be easily installed in the cable tray 20 using the cable feeder 100. Numerous mounting assemblies 32 can be provided along the length of the cable tray 20 so that a variety of cable feeders 100 can be used. Different cable feeders 100 can be mounted onto the same rod 36 during the assembly process of the mounting assembly 32.

The cable feeder 100 and its mounting assembly 32 can be easily disengaged from the cable tray 20. To do so, the tension on the strap 78 is released by the user activating the ratchet 76 and the hook 80 is released from the hook attachment member 62. The strap 78 and its hook 80 are retracted into the ratchet 76. The mounting assembly 32 is then lifted off of the cable tray 20.

While the ratchet mechanism 72 is shown and described as being on the first arm 38 and the hook attachment member 62 is shown and described as being on the second arm 40, it is to be understood that the ratchet mechanism 72 can be on the second arm 40 and the hook attachment member 62 can be on the first arm 38. With this alternative, the strap 78 is still extended and passed under the cable tray 20 to secure the mounting assembly 32 to the cable tray 20.

Figure 2:
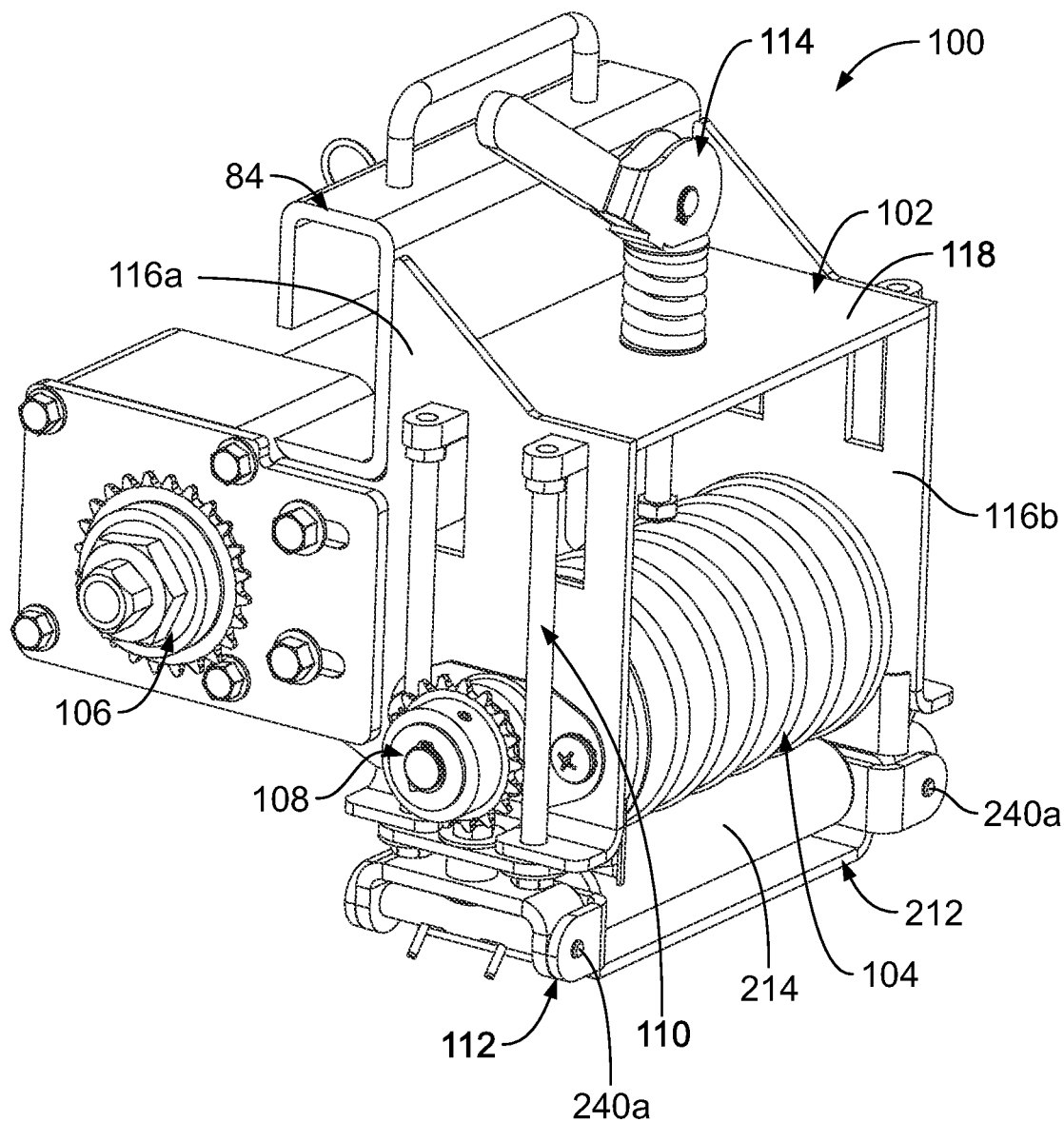
FIG. 2 is an alternate perspective view of the cable feeder of FIG. 1 with a cover removed to illustrate a motor and a slip clutch.
Figure 5:
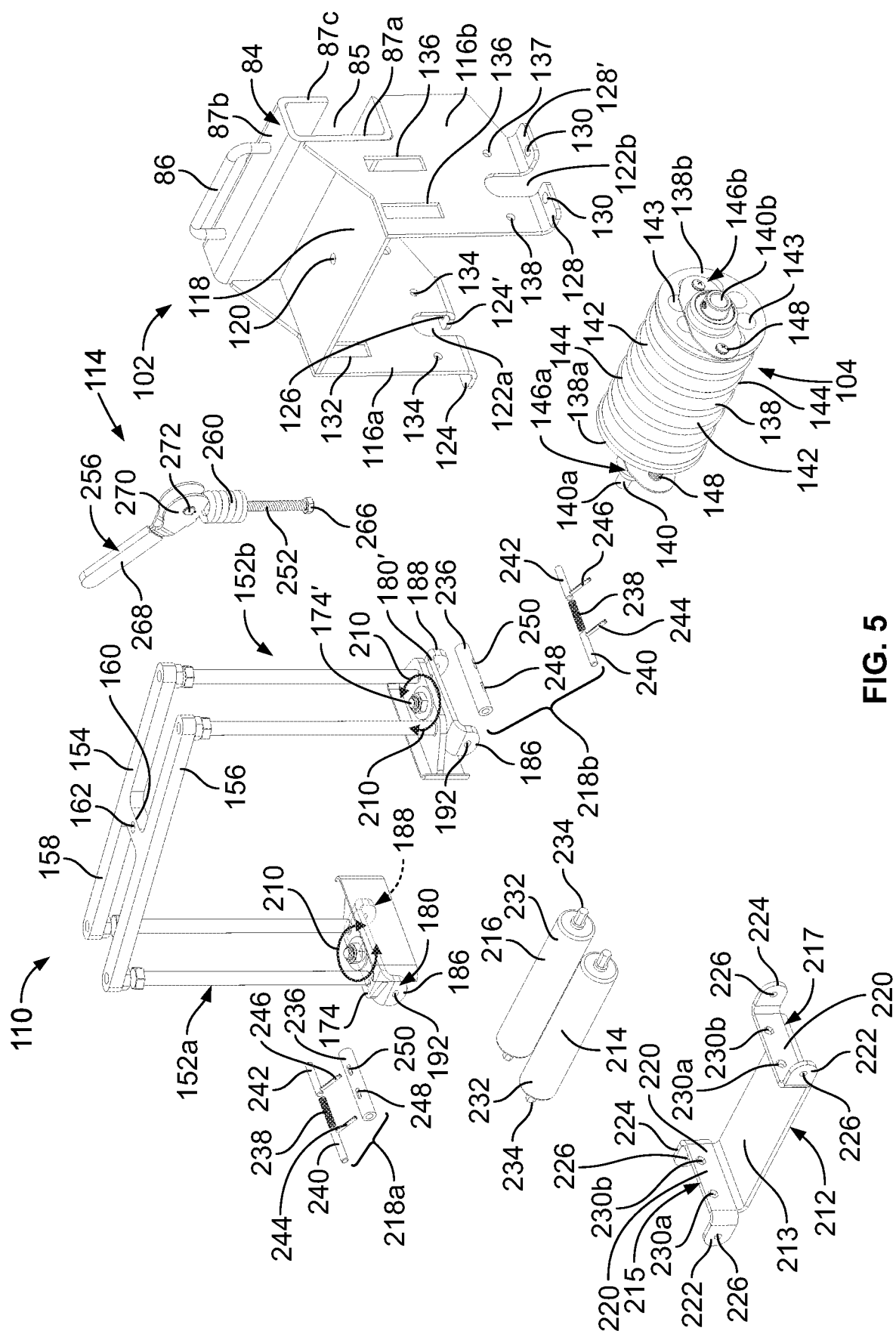
FIG. 5 is an exploded perspective view of the cable feeder of FIG. 1.

As shown in FIGS. 1, 2 and 5, the cable feeder 100 includes an upper housing 102 attached to the feeder mounting channel 84, a drive roller 104 rotatably attached to the upper housing 102 and driven by a motor 106 via a slip clutch 108, a lower housing 110 mounted to the upper housing 102 and which is movable relative thereto, an idler roller assembly 112 attached to the lower housing 110, and a driver 114 for moving the position of the lower housing 110 and the idler roller assembly 112 relative to the upper housing 102.

As best shown in FIG. 5, the upper housing 102 has a pair of vertical side walls 116*a*, 116*b* having a top wall 118 extending between top ends of the side walls 116*a*, 116*b*. The top wall 118 has a central aperture 120 provided therethrough. The side walls 116*a*, 116*b* and the top wall 118 are attached to the mounting channel 84. A cutout 122*a*, 122*b* extends upwardly from the bottom end of each side wall 116*a*, 116*b* and are aligned with each other. A pair of spaced apart tabs 124, 124' extend outwardly from the bottom end of side wall 116*a* and are provided on either side of the cutout 122*a*. Each tab 124, 124' has aperture 126 therethrough. A pair of spaced apart tabs 128, 128' extend outwardly from the bottom end of side wall 116*b* and are provided on either side of the cutout 122*b*. Each tab 128, 128' has aperture 130 therethrough. Side wall 116*a* further has a pair of spaced apart elongated slots 132 proximate to an upper end thereof and a pair of apertures 134 proximate to, but spaced from the cutout 122*a*. The slots 132 extend vertically along the side wall 116*a*. Side wall 116*b* further has a pair of spaced apart elongated slots 136 proximate to an upper end thereof and a pair of apertures 137 proximate to, but spaced from the cutout 122*b*. The slots 136 extend vertically along the side wall 116*b* and are aligned with the slots 132 on side wall 116*a*.

Figure 5A:
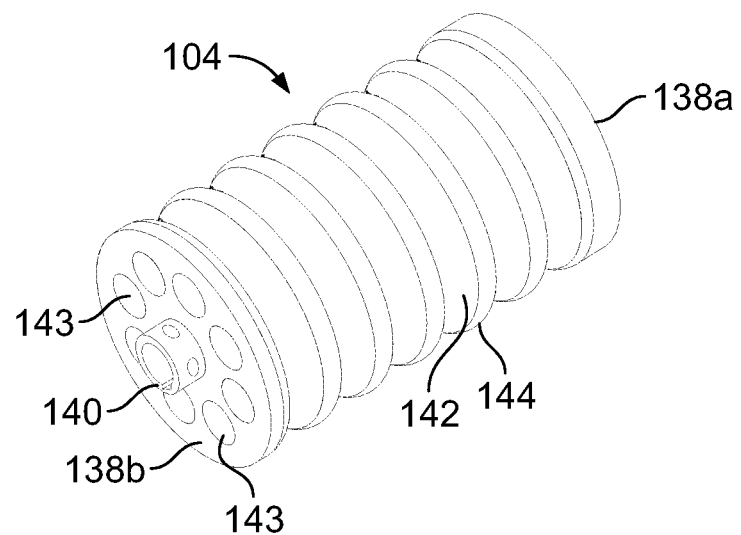
FIG. 5A is a perspective view of a drive roller of the cable feeder of FIG. 1.

As shown in FIGS. 5 and 5A, the drive roller 104 is formed of a generally cylindrical outer roller 138 having first and second opposite ends 138*a*, 138*b* and having a cylindrical drive shaft 140 extending therethrough. The drive shaft 140 has first and second opposite ends 140*a*, 140*b*. The outer roller 138 in the illustrated embodiment has a series of grooves 142 in the surface thereof which are separated from each other by ridges 144. Accordingly, the grooves 142 and ridges 144 alternate along the length of the outer roller 138. Each groove 142 and each ridge 144 extends 360 degrees around the circumference of the outer roller 138. The outer roller 138 has a plurality of spaced apart passageways 143 which extend between the opposite ends 140*a*, 140*b*. The passageways 143 may be evenly spaced around the circumference of the outer roller 138. The outer roller 138 is mounted between the side walls 116*a*, 116*b* and the ends 140*a*, 140*b* of the drive shaft 140 extend through the cutouts 122*a*, 122*b*. The ends 140*a*, 140*b* of the drive shaft 140 are suitably secured to the respective side wall 116*a*, 116*b*, while allowing rotation of the drive shaft 140 relative to the side walls 116*a*, 116*b*. For example, the drive shaft 140 may be secured to the side walls 116*a*, 116*b* via a bearing assembly 146a, 146b which is fastened by fasteners 148 extending through the apertures 134, 137. The outer roller 138 is preferably formed of urethane rubber, however, the outer roller 138 can also be pneumatic. If the outer roller 138 is pneumatic, the passageways 143 are eliminated. The material of which the outer roller 138 is formed is durable and robust to allow for proper friction and a long life.

A cable 28 can seat into each groove 142 of the drive roller 104 during operation of the cable feeder 100 and the drive roller 104 is used to move the cable 28 relative to the cable tray 20. The shape of the outer roller 138 allows a high amount of surface area contact between the outer roller 138 and the cable(s) 28 to efficiently and effectively transfer the kinetic energy to the cable(s) 28. The passageways 143 allow the outer roller 138 to deform, thereby allowing the outer roller 138 to create a surface which is more conducive to engaging the cable 28. The drive roller 104 moves the cable(s) 28 without damaging the cable(s) 28. The outer roller 138 has a varied surface and cross-section which provides deformation of surface of the outer roller 138 and traction between the outer roller 138 and the cable(s) 28. As shown, the outer roller 138 has a cross-section with spokes, along with the grooves 142. The cross-section allows the outer roller 138 to deform, allowing the outer roller 138 to create a surface more conducive to grabbing or engaging the cable 28. The grooves 142 perform a similar function of giving the outer roller 138 the ability to grab or engage the cable(s) 28, as well as guide cable(s) 28 in the particular groove 142 and prevent cable(s) 28 from traveling across the surface of the outer roller 138.

It will be appreciated that the foregoing description of the outer roller 138 is provided by way of example, and not by way of limitation. In this regard, other outer roller geometries are contemplated within the scope of the disclosure. In alternative embodiments, an outer roller having a non-grooved, substantially continuous surface around the circumference may be used.

The motor 106 and slip clutch 108 are attached to side wall 116a of the upper housing 102, see FIG. 2. Since the upper housing 102 is fixed in place, the motor 106 and the slip clutch 108 do not move upwardly or downwardly during the movements described herein. The slip clutch 108 is connected to the motor 106 via an endless traction member (not shown), such as chain or belt, and to the first end 140a of the drive shaft 140 in a conventional manner. The slip clutch 108 is covered by a housing 150 attached to the side wall 116a (the housing 150 is shown removed in FIG. 2). The slip clutch 108 is designed to slip at a certain torque, preferably when 200 lbs. output is applied, to the drive roller 104 and the slip clutch 108 automatically resets when the torque is reduced below the threshold. This prevents the drive roller 104 from putting too much force on the cable 28 to damage the insulation or damage the drive roller 104 itself. The auto reset of the slip clutch 108 creates a seamless user interface.

Figure 6:
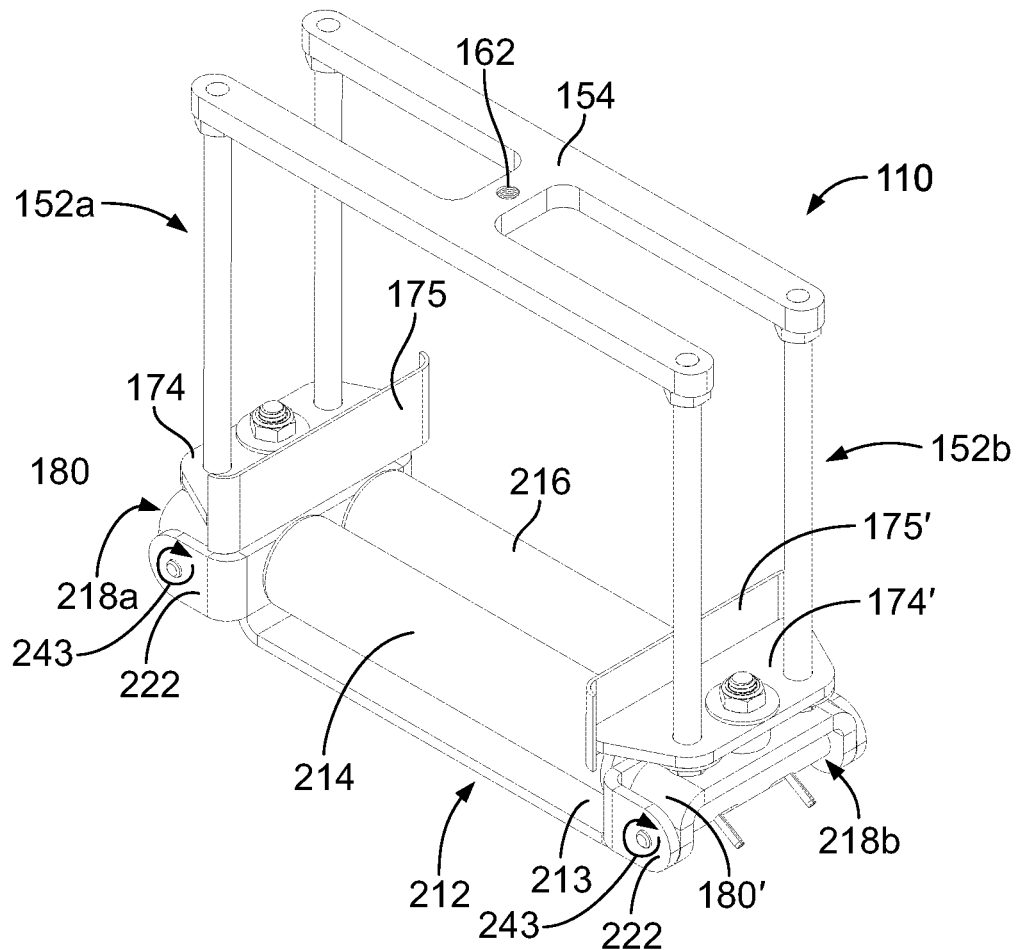
FIG. 6 is a perspective view of a lower housing and an idler roller assembly of the cable feeder of FIG. 1.
Figure 7:
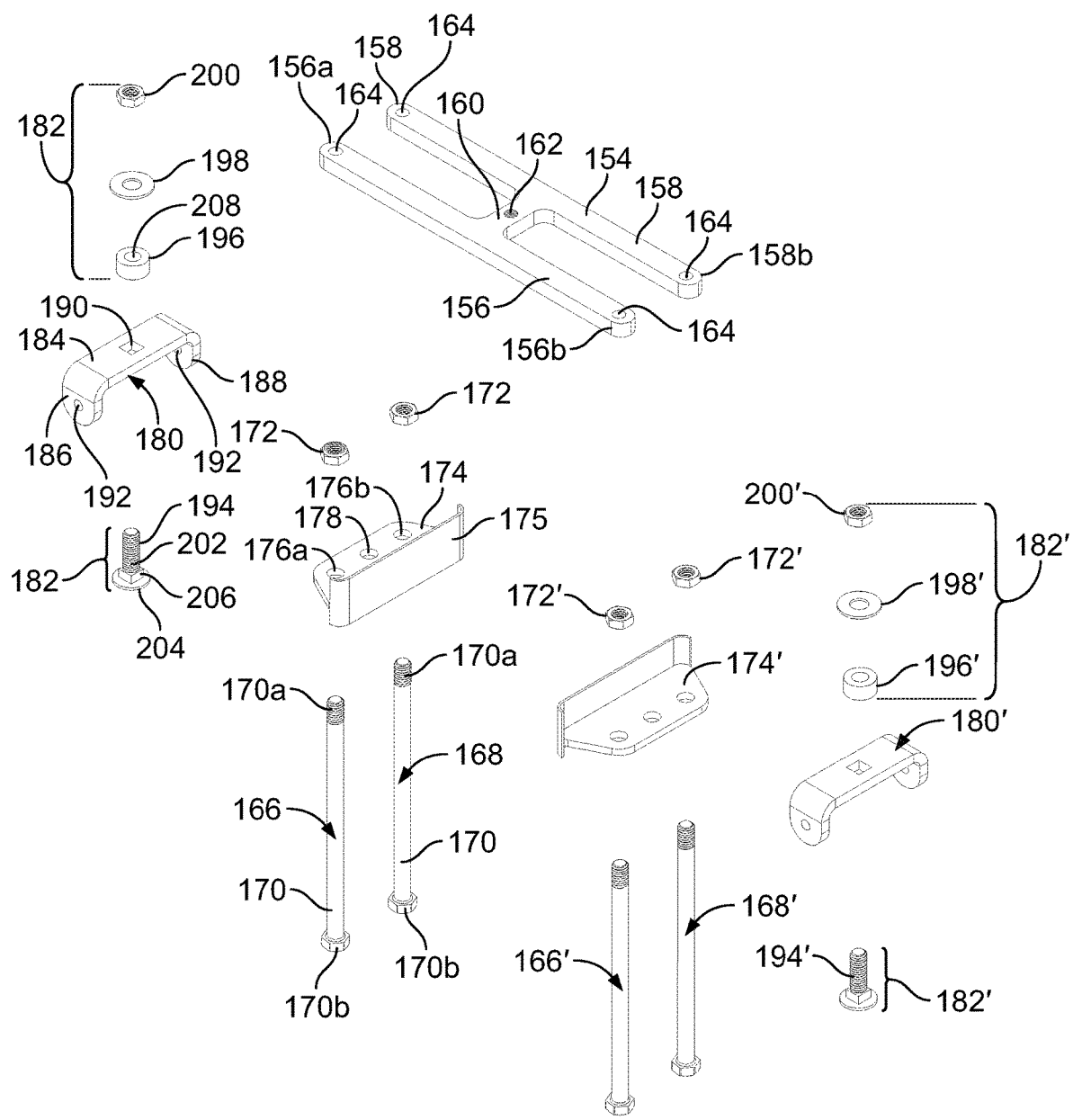
FIG. 7 is an exploded perspective view of the lower housing of the cable feeder of FIG. 1.
Figure 8:
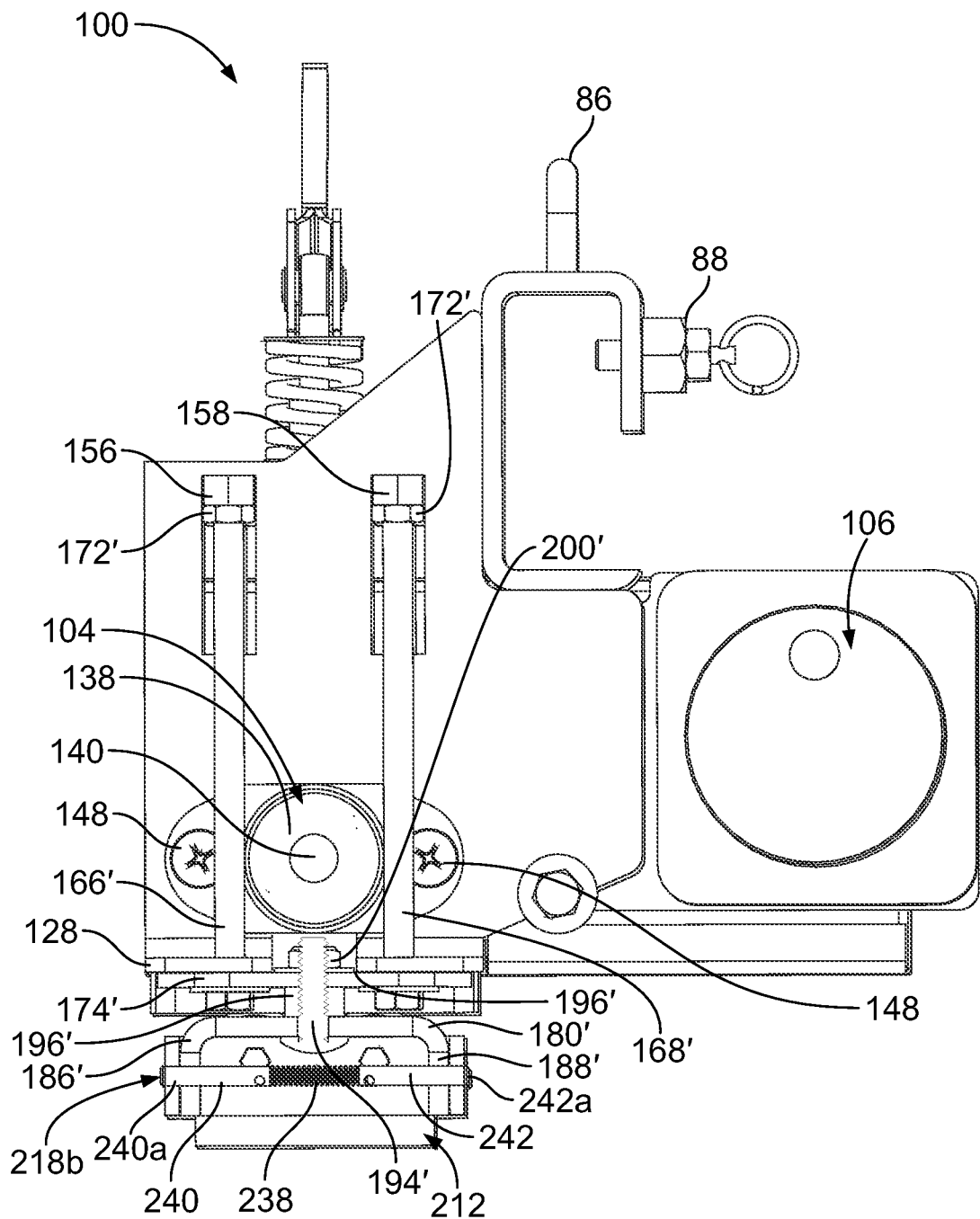
FIG. 8 is a cross-sectional view of the cable feeder of FIG. 1.

With continued reference to FIG. 5 and with reference to FIGS. 6 and 7, the lower housing 110 has first and second vertical side walls 152a, 152b with a horizontal top wall 154 extending between the top ends thereof. The top wall 154 seats below the top wall 118 of the upper housing 102 and extends through the slots 132, 136 in the side walls 116a, 116b of the upper housing 102. The side walls 152a, 152b of the lower housing 110 are proximate to the outer surfaces of the side walls 116a, 116b of the upper housing 102.

As shown in FIG. 7, the top wall 154 generally forms an H-shape and has first and second elongated bars 156, 158 with a central cross-bar 160 extending therebetween. An aperture 162 is provided through the cross-bar 160. The top wall 154 seats underneath the top wall 118 of the upper housing 102 and the apertures 120, 162 align with each other. The ends 156a, 158a of the bars 156, 158 extend through the slots 132 in side walls 116a, and the ends 156b, 158b of the bars 156, 158 extend through the slots 136 in side walls 116b. Each end 156a, 156b, 158a, 158b has an aperture 164 therethrough.

With continued reference to FIG. 7, the first side wall 152a is formed from a rod 166 extending from the end 156a of bar 156, a rod 168 extending from the end 158a of bar 158. Each rod 166, 168 has a shaft 170 having a threaded end 170a at the upper end of the shaft 170 and an enlarged head 170b at the lower end of the shaft 170. The threaded ends 170a are threaded engaged with the apertures 164 in the ends 156a, 158b of the bars 156, 158 and secured thereto by a nut 172.

The first side wall 152a is further formed from a horizontal upper plate 174 which is attached to the lower ends of the rods 166, 168, and a vertical plate 175 which is attached to an interior end of the upper plate 174. The rods 166, 168 pass through spaced apart apertures 176a, 176b in the upper plate 174 and the heads 170b engage against the lower surface of the upper plate 174. The upper plate 174 further includes a central aperture 178 which is between the apertures 176a, 176b. The first side wall 152a is further formed from a lower plate 180 attached to the upper plate 174 by a rotational assembly 182 which allows the lower plate 180 to rotate relative to the upper plate 174 in the direction of arrows 210, see FIG. 5.

The lower plate 180 is generally U-shaped having a horizontal base wall 184 and a pair of arms 186, 188 extending downwardly therefrom. The base wall 184 has a central square aperture 190 therethrough. Each arm 186, 188 has an aperture 192 therethrough.

The rotational assembly 182 includes a fastener 194, a spacer 196, a washer 198 and a nut 200 for connecting the lower plate 180 to the upper plate 174 and for allowing the lower plate 180 to rotate relative to the upper plate 174. The fastener 194 has a threaded shaft 202 having an enlarged head 204 at and end thereof, and a square shoulder 206 between the shaft 202 and the head 204. The square shoulder 206 seats in the square aperture 190 such that the lower plate 180 is non-rotationally fixed relative to the fastener 194 and the enlarged head 204 is below the lower plate 180. The aperture 190 and the shoulder 206 can take other shapes so long as the lower plate 180 and the fastener 194 are non-rotationally fixed relative to each other. The shaft 202 extends through a central passageway 208 in the spacer 196, through the aperture 178 in the upper plate 174, through the washer 198 and then through the nut 200 which attaches the fastener 194 to the upper plate 174. The passageway 208 in the spacer 196 and the aperture 178 in the upper plate 174 are larger than the shaft 202 such that the fastener 194 and the attached lower plate 180 can rotate relative to the upper plate 174 in the directions of arrow 210.

The second side wall 152b is identical to the first side wall 152a and, as such is not described in detail. Like elements are denoted with like reference numbers having a prime after the reference numeral.

The side walls 152a, 152b can be modified to eliminate the upper plate 174, 174' and the rotational assembly 182, 182' and instead have the rods 166, 168, 166', 168' directly attach to the lower plate 180, 180' (thereby removing the rotational movement between the upper and lower plates 174, 174', 180, 180') to reduce part count.

As shown in FIG. 6, the idler roller assembly 112 attaches to the lower plates 180, 180'. As shown in FIG. 5, the idler roller assembly 112 includes a bracket 212 to which two idler rollers 214, 216 are rotatably attached, and a release mechanism 218a, 218b at each end 212a, 212b of the bracket 212 for disengaging an end of the bracket 212 and its attached idler rollers 214, 216 from the lower housing 110.

The bracket 212 has a horizontal base wall 213, a first U-shaped side wall 215 extending upwardly from a first end of the base wall 213, and a second U-shaped side wall 217 extending upwardly from a second end of the base wall 213. Each side wall 215, 217 has a central wall 220 which extends perpendicularly to the base wall 213, and a pair of arms 222, 224 which extend outwardly from the central wall 220. Each arm 222, 224 has an aperture 226 therethrough. The central wall 220 has a pair of spaced apart apertures 230a, 230b provided therethrough. The lower plate 180 of the lower housing 110 seats within the side wall 215 and the apertures 192, 226 align with each other; the lower plate 180' of the lower housing 110 seats within the side wall 217 and the apertures 192, 226 align with each other.

The idler rollers 214, 216 have an outer roller 232 having a central shaft 234 extending therethrough. The outer rollers 232 seat between the side walls 215, 217 and the ends of the shafts 234 extend through the apertures 230a, 230b in the side walls 215, 217. The shafts 234 are non-rotationally fixed to the bracket 212. The outer rollers 232 freely rotate relative to the shafts 234.

Each release mechanism 218a, 218b has a tube 236 having a central passageway therethrough. Within the central passageway, a compressible member 238, such as a spring, is positioned between two pins 240, 242 which extend outwardly from the ends of the tube 236. Each pin 240, 242 has a passageway therethrough spaced from the end which is proximate to the compressible member 238 for acceptance of a secondary pin 244, 246 therein. Each tube 236 has aligned pairs of spaced apart elongated slots 248, 250 which extend a portion of the length of the tube 236. The slots forming pair 248 are diametrically opposed to each other, and the slots forming pair 250 are diametrically opposed to each other. Slots 248 aligns with the aperture through which pin 244 extends, and slots 250 aligns with the aperture through which pin 246 extends. As shown, the tube 236 seats between the arms 186, 188 of the lower plate 180, 180' and the arms 186, 188 seat between the arms 186, 188 of the bracket 212 when the release mechanisms 218a, 218b are engaged. The ends 240a, 242a of the pins 240, 242 extends through the aligned apertures 192, 226 in the arms 186/222, 188/224.

The pins 240, 242 can be grasped by a user and moved inwardly toward each other, thereby compressing the compressible member 238. This releases the ends 240a, 242a of the pins 240, 242 from their engagement with the arms 222, 224 of the bracket 212, while maintaining their engagement with the arms 186, 188 of the lower plate 180, 180', and allows the bracket 212 and its attached idler rollers 214, 216 to pivot around the release mechanism 218a, 218b on the other side of the idler roller assembly 112 to open the cable feeder 100. As such, the mechanism 218a, 218b on the other side of the idler roller assembly 112 forms a hinge around which the bracket 212 and its attached idler rollers 214, 216 rotate. During this movement, the bracket 212 and its attached idler rollers 214, 216 rotate around an axis defined by the release mechanism 218a, 218b on the other side of the idler roller assembly 112 in the direction of arrows 243, see FIG. 6. The axis defined by the release mechanism 218a, 218b is preferably horizontal. The rotational assembly 182 on the attached side allows the lower plate 180, 180', the bracket 212 and its attached idler rollers 214, 216 to rotate relative to the lower housing 110 to further open the cable feeder 100. Either side of the idler roller assembly 112 can be released. Both sides of the idler roller assembly 112 can also be released.

Alternatively, the arms 186, 188 of the lower plate 180, 180' can seat between the arms 222, 224 of the bracket 212, such that the tube 236 seats between the arms 222, 224 of the bracket 212 when the release mechanisms 218a, 218b are engaged. The ends 240a, 242a of the pins 240, 242 extends through the aligned apertures 192, 226 in the arms 186/222, 188/224. In this configuration, the pins 240, 242 can be grasped by a user and moved inwardly toward each other, thereby compressing the compressible member 238. This releases the ends 240a, 242a of the pins 240, 242 from their engagement with the arms 186, 188 of lower plate 180, 180', while maintaining their engagement with the arms 222, 224 of the bracket 212, and allows the bracket 212 and its attached idler rollers 214, 216 to pivot around the release mechanism 218a, 218b on the other side of the idler roller assembly 112 to open the cable feeder 100. Again, the mechanism 218a, 218b on the other side of the idler roller assembly 112 forms a hinge around which the bracket 212 and its attached idler rollers 214, 216 rotate as shown by arrow 243. The rotational assembly 182 on the attached side allows the lower plate 180, 180', the bracket 212 and its attached idler rollers 214, 216 to rotate relative to the lower housing 110 to further open the cable feeder 100. Either side of the idler roller assembly 112 can be released and then reattached. Both sides of the idler roller assembly 112 can also be released.

Alternatively, one of the pins 240, 242 in each release mechanism 218a, 218b could be eliminated such that only a single pin, for example pin 240 with its associated compressible member 238, is provided. The single pin would extend through one set of the arms for example 186, 222.

Figure 9:
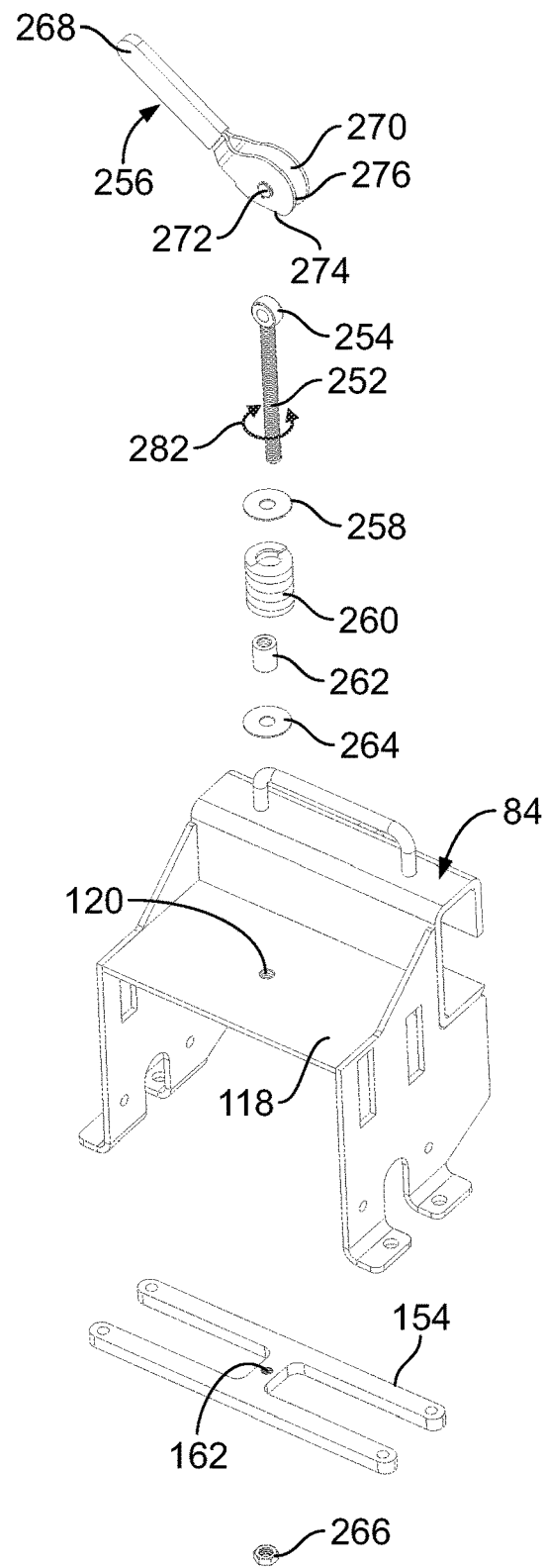
FIG. 9 is an exploded perspective view of the upper housing, a portion of the lower housing, and a driver of the cable feeder of FIG. 1.
Figure 10:
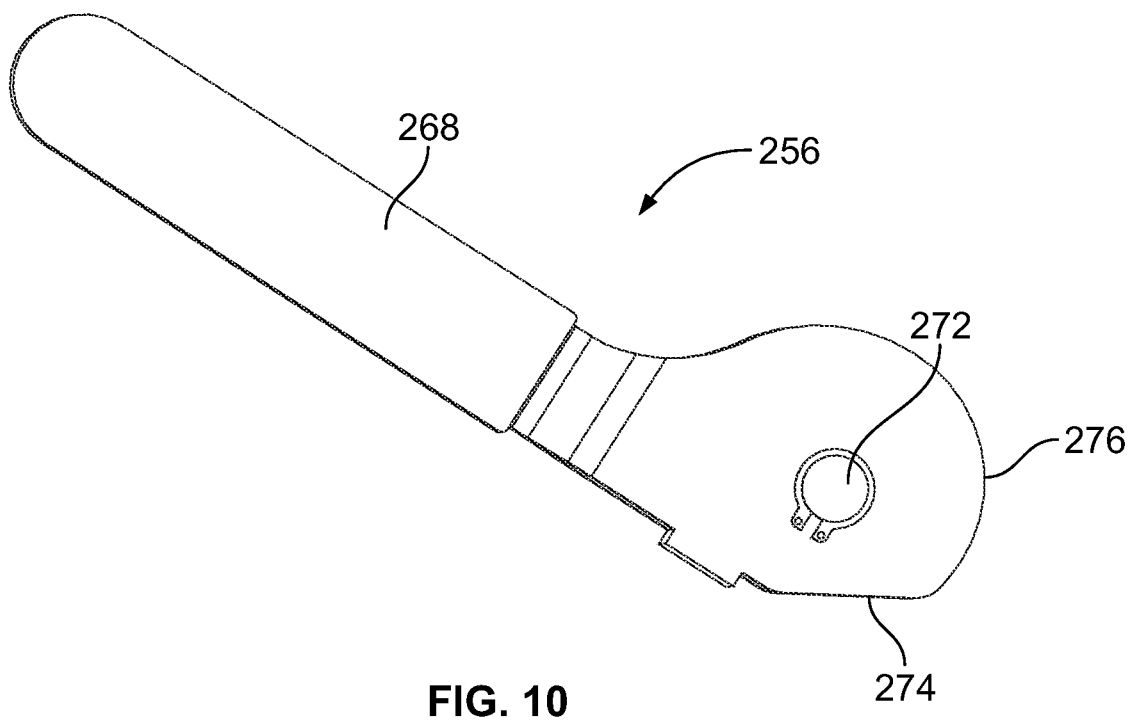
FIG. 10 is a side elevation view of a handle of the driver of FIG. 9.

As best shown in FIG. 9, the driver 114 includes a shaft 252 having an enlarged head 254 at an upper end thereof, a handle 256 rotatably attached to the head 254, a first washer 258 mounted on the shaft 252 and bearing against a lower end of the head 254, a coil spring 260 mounted on the shaft 252 and bearing against the first washer 258, a bearing 262 mounted in a lower end of the spring 260 and through which the shaft 252 extends, a second washer 264 through which the shaft 252 extends and bearing against the lower ends of the spring 260 and the bearing 262, and a nut 266 threadedly attached to the lower end of the shaft 252. The shaft 252 extends through the aligned apertures 120, 162 in the upper housing 102 and in lower housing 110 such that the enlarged head 254 is above the top wall 118 of the upper housing 102. The washer 264 seats on the top surface of the top wall 118 of the upper housing 102 and the bearing 262, coil spring 260 and washer 258 seat between the enlarged head 254 and the top wall 118. The shaft 252 is threadedly engaged with the aperture 162 in the lower housing 110. The nut 266 attaches to the lower end of the shaft 252 below the top wall 154 of the lower housing 110 to secure the shaft 252 to the lower housing 110.

Figure 11:
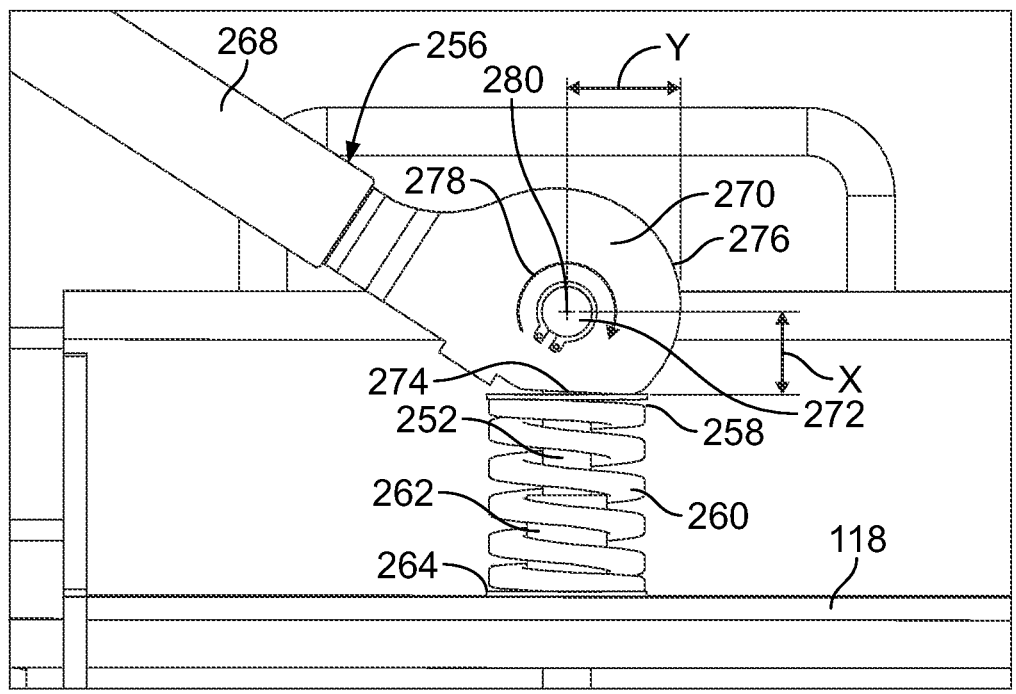
FIG. 11 is a front elevation view of a portion of the cable feeder of FIG. 1.

The handle 256 has an elongated gripping portion 268 with an enlarged head 270 at the lower end which connects to the head 254 of the shaft 252 via a pivot pin 272. The head 270 has a generally planar surface 274 and a curved cam surface 276 extending from the generally planar surface 274. The head 270 abuts against the washer 258. The handle 256 rotates relative to the shaft 252 around pivot pin 272 in the direction of arrow 278, see FIG. 11. The axis defined by pivot pin 272 is preferably horizontal. As shown in FIG. 11, the distance between the center point 280 of the pivot pin 262 and the generally planar surface 274 is defined as X in the drawings. The distance between the center point 280 of the pivot pin 262 and the curved cam surface 276 is defined as Y in the drawings. The distance Y is greater than the distance X.

When the handle 256 is in the position where the generally planar surface 274 is in contact with the washer 258, as shown in FIG. 11, the generally planar surface 274 has a portion which contacts the washer 264 and a portion which is spaced from the washer 264. In this position, the idler rollers 214, 216 of the idler roller assembly 112 are spaced from the drive roller 104 and the spring 260 is in an expanded condition. Cable 28 is fed between the drive roller 104 and the idler rollers 214, 216. If a clevis or other larger portion of the cable 28 passes between the drive roller 104 and the idler rollers 214, 216, the idler roller assembly 112 moves downwardly relative to the upper housing 102 (which is fixed in position on the rod 36) and the spring 260 compresses to allow for this downward movement. After the larger portion of the cable 28 passes through the feeder 100, the spring 260 expands and moves the idler roller assembly 112 back to its initial position. After the larger portion of the cable 28 passes through the feeder 100, the user can rotate the handle 256 in the direction of arrow 278 to move the idler roller assembly 112 upwardly and thus move the idler rollers 214, 216 upwardly toward the drive roller 104 to form a nip through which the cable 28 passes. To effect this, the user grasps the gripping portion 268 and rotates the head 270 of the handle 256 around the pin 272 in the direction of arrow 278. When the curved cam surface 276 contacts the washer 258, the shaft 252 is moved upwardly to move the attached lower housing 110 and idler roller assembly 112 upwardly as a result of the fact that the distance Y is greater than the distance X. When the curved cam surface 276 contacts the washer 258, the spring 260 may compress slightly, however, the force of the head 270 on the washer 258 does not appreciably overcome the spring force. Since the lower housing 110 is fixed to the shaft 252 as a result of the threaded engagement of the shaft 252 with the upper wall 154 of the lower housing 110, this causes lower housing 110 to move upwardly relative to the upper housing 102, thereby causing the idler rollers 214, 216 to move into close proximity to the drive roller 104 to form the nip. The cable 28 then easily feeds through the feeder 100 and the cables 28 flow through the grooves 142. The grooves 142 prevent adjacent cables 28 being fed through the cable feeder 100 from being entangled. The driver 114 provides for a single action cam clamp to clamp the idler rollers 214, 216 onto the cable(s) 28. This provides for a quick, fast repeatable way to apply the necessary clamping force to transfer the pulling force efficiently to the cable(s) 28.

To lower the idler roller assembly 112, the handle 256 is rotated in the direction opposite to arrow 278. When the generally planar surface 274 comes into contact with the washer 258, since the distance X is smaller than the distance Y, the shaft 252 moves downwardly relative to the upper housing 102, thereby causing the lower housing 110 to move lower relative to the upper housing 102.

The handle 256 and shaft 252 can also be rotated around the axis of the shaft 252 in the directions of arrows 282, see FIG. 9. The axis of the shaft 252 is preferably vertical. When the user rotates the handle either of these directions shown by arrow 282, the shaft 252 rotates relative to the lower housing 110 as a result of the threaded engagement between the shaft 252 and the upper wall 154 of the lower housing 110. This causes the lower housing 110 to move upwardly or downwardly, depending on the direction of the rotation, in order to effect fine adjustments in the location of the idler rollers 214, 216 relative to the drive roller 104. That is, the idler roller assembly 112 is moved into different positions relative to the drive roller 104 by these fine adjustments to vary the spacing.

In each of these movements, the drive roller 104 does not move upwardly or downwardly. This prevents the need for complicated mechanical mechanisms to maintain tension on the drive chain if the drive roller 104 were moving.

The cable feeder 100 can be translated along the length of the rod 36 to a desired position and then fixed in place by using the lock 88. During this movement, the cable feeder 100 moves laterally relative to the cable tray 20, that is the cable feeder 100 moves from one side of the cable tray 20 toward the other side of the cable tray 20. Once the cable pull is completed, the user can activate the release mechanism 218a, 218b on either or both sides of the lower housing 110 to open the cable feeder 100 and to allow the cable 28 to be removed from the cable feeder 100 and dropped onto the cable tray 20. This enables the cable feeder 100 to drop the cables 28 down into the cable tray 20 in the vertical direction. In the prior art, since prior art feeders sit in the cable tray, if the cable tray is full of cable, the user has to remove the cable feeder to place the cable in the cable tray. In the prior art, the user cannot use feeders once the cable tray was more than approximately 50% full. The cable feeder 100 allows a user to install cable 28 in cable trays 20 that are 99% full. The release mechanism 218a, 218b can be rotated around the axis defined by shaft 202 which is shown by arrow 210 to move the idler roller assembly 112. The axis defined by shaft 202 is preferably vertical. This rotational movement of the release mechanism 218a, 218b makes dropping cables 28 vertically into their final position very simple and straight forward.

This cable feeder 100 solve excessive time/manpower requirements currently associated with setting up and performing cable tray pulls. The cable feeder 100 can pull cable(s) of a variety of sizes and types.

Figure 12:
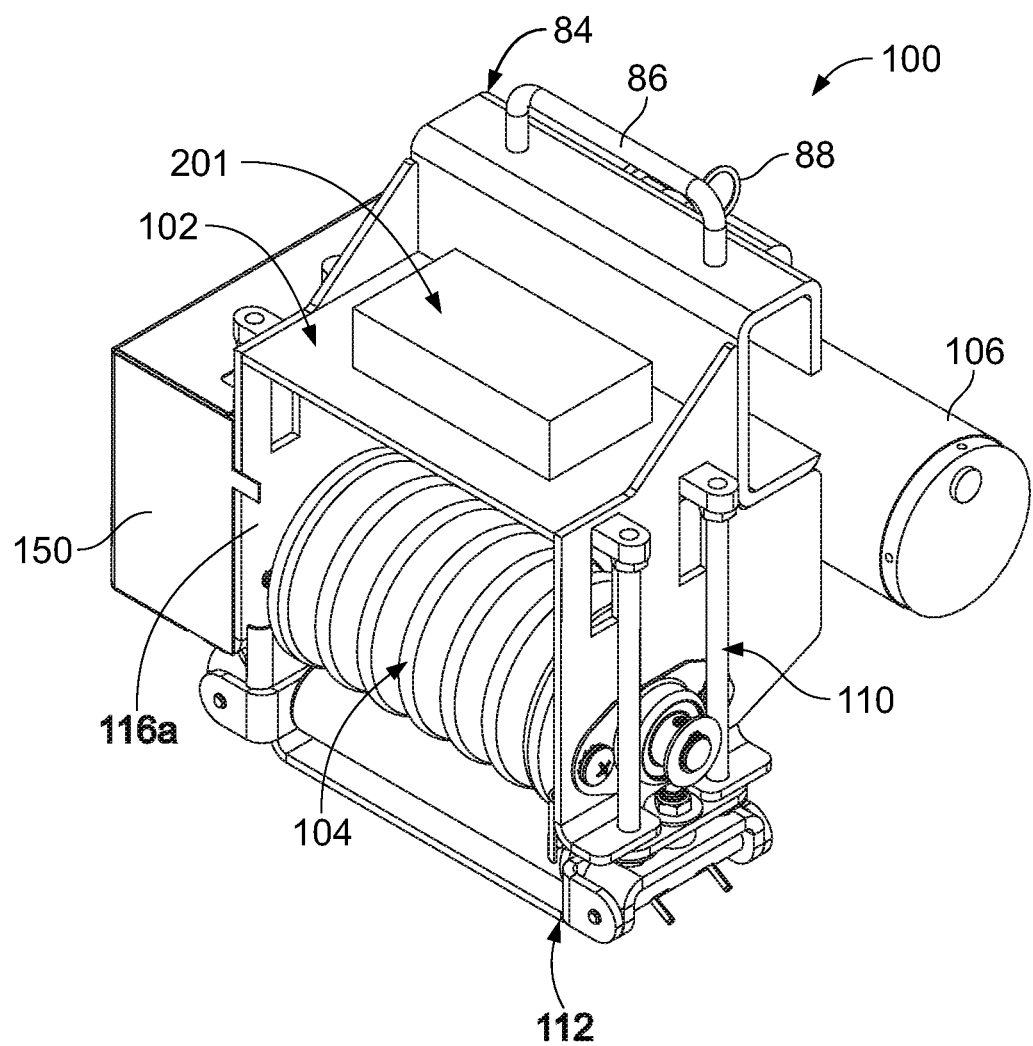
FIG. 12 is a perspective view of a cable feeder according to a second embodiment of the disclosure.

While the mechanical driver 114 is shown and described, it is to be understood that the shown driver 114 can be replaced by a motor 201, see FIG. 12, which moves the shaft 252 upwardly or downwardly relative to the upper housing 102, and spins the shaft 252 around arrow 282 to effect the fine adjustments.

Collectively, the upper housing 102 and the lower housing 110 form a housing. While the housings 102, 110 are shown as two separate components, a single housing can be provided if the fine adjustments provided by the handle 256/shaft 252 or motor 201 is not desired.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A cable feeder configured to feed cables through a structure comprising:
   an upper housing;
   an upper roller attached to the upper housing;
   a lower housing movably attached to the upper housing;
   a bracket attached to and movable with the lower housing;
   at least one lower roller attached to the bracket;
   a hinge around which the bracket can pivot relative to the lower housing;
   a release mechanism attaching the bracket to the lower housing, the release mechanism capable of being disengaged to allow the bracket and the at least one lower roller to rotate downwardly around the hinge relative to the lower housing, the release mechanism capable of being engaged to prevent movement of the bracket relative to the lower housing;
   a shaft connected between the upper and lower housings, the shaft being movable relative to the upper housing, the shaft being threadedly attached to the lower housing;
   a hand-actuated handle pivotally connected to the shaft above the upper housing;
   a spring mounted on the shaft and engaged with the upper housing and the handle,
   wherein pivotal movement of the handle causes movement of the shaft, the lower housing and the at least one lower roller into different positions relative to the upper housing and wherein rotational movement of the handle causes rotational movement of the shaft relative to the lower housing, and vertical translation of the lower housing and the at least one lower roller relative to the upper housing.

2. The cable feeder of claim 1, wherein the pivotal movement of the handle causes a cam surface on the handle to engage with the spring to cause the movement of the shaft, the lower housing and the at least one lower roller into different positions relative to the upper housing.

3. The cable feeder of claim 1, wherein the upper roller includes a plurality of grooves which are separated from each other by ridges, each groove being sized to receive a cable therein.

4. The cable feeder of claim 3, wherein the upper roller further has a plurality of passageways therethrough which extend from a first end to a second end of the upper roller.

5. The cable feeder of claim 1, wherein the release mechanism comprises at least one pin housed within a tube, the at least one pin being movable to disengage the release mechanism.

6. The cable feeder of claim 5, wherein the release mechanism further comprises a compressible member engaged with the at least one pin.

7. The cable feeder of claim 1, wherein the upper roller is a driven roller.

8. The cable feeder of claim 7, wherein the lower roller is an idler roller.

9. A cable feeder configured to feed cables through a structure comprising:
   an upper housing;
   an upper roller attached to the upper housing;
   a lower housing movably attached to the upper housing;
   a bracket attached to and movable with the lower housing;
   at least one lower roller attached to the bracket;
   a hinge around which the bracket can pivot relative to the lower housing;
   a release mechanism attaching the bracket to the lower housing, the release mechanism capable of being disengaged to allow the bracket and the at least one lower roller to rotate around the hinge and downwardly relative to the lower housing, the release mechanism capable of being engaged to prevent movement of the bracket relative to the lower housing;
   a shaft extending through the upper housing and being threadedly attached to the lower housing; and
   a motor connected to the shaft, the motor being above the upper housing, wherein the motor is configured to be activated in a first movement to move the shaft, the lower housing and the at least one lower roller into different vertical positions relative to the upper housing and the motor is configured to be activated in a second movement to cause rotational movement of the shaft relative to the lower housing and vertical translation of the lower housing and the at least one lower roller relative to the upper housing.

10. The cable feeder of claim 9, wherein the upper roller includes a plurality of grooves which are separated from each other by ridges, each groove being sized to receive a cable therein.

11. The cable feeder of claim 10, wherein the upper roller further has a plurality of passageways therethrough which extend from a first end to a second end of the upper roller.

12. The cable feeder of claim 9, wherein the release mechanism comprises at least one pin housed within a tube, the at least one pin being movable to disengage the release mechanism.

13. The cable feeder of claim 12, wherein the release mechanism further comprises a compressible member engaged with the at least one pin.

14. The cable feeder of claim 9, wherein the upper roller is a driven roller.

15. The cable feeder of claim 14, wherein the lower roller is an idler roller.

* * * * *